United States Patent Office 2,884,414
Patented Apr. 28, 1959

2,884,414

COMPOSITION AND METHOD OF STABILIZING ε-CAPROLACTAM

Heinz Indest, Heinz Massat, and Helmut Stöhr, Obernburg, Main, Germany, assignors to Vereinigte Glanzstoff-Fabriken A.G., Wuppertal-Elberfeld, Germany No Drawing. Application January 23, 1957
Serial No. 635,588

Claims priority, application Germany January 25, 1956

6 Claims. (Cl. 260—239.3)

This invention relates to a composition and method of stabilizing ε-caprolactam, and more particularly to the incorporation of a small quantity of a specific additive to ε-caprolactam to prevent harmful deterioration when handling the lactam in its liquid state.

ε-Caprolactam is an important raw material in the production of polyamides and is generally stored, transported or otherwise handled in bulk quantities. This material handling of ε-caprolactam has heretofore been accomplished in the solid state. However, this method of handling the lactam in the solid state has several serious disadvantages. It is known that a finely divided, solid ε-caprolactam tends to agglomerate forming a solid aggregate or block of material so that after storage in a barrel, bag, carton or the like, it becomes necessary to mechanically crush or pulverize the aggregate in order to regain the compound in its granular form. During various material handling operations such as crushing, packing, storing, and transporting, and even during the production of the lactam, there is a considerable danger of contamination, particularly from dust or other contaminating matter in the surrounding atmosphere. Furthermore, the lactam must be remelted for use as a raw material, thereby requiring an additional step and expenditure of time and effort by the processor.

Therefore, it seemed highly desirable that ε-caprolactam be stored, transported or otherwise handled in a liquified state. However, it has been found that a liquified ε-caprolactam deteriorates and discolors, i.e., tends to turn yellow, upon storage, even for a relatively short period of time. This deterioration appears to be caused by a reaction with atmospheric oxygen, and although it might be possible to store the liquid lactam in an inert or protective atmosphere such as nitrogen, it is not always possible to completely exclude oxygen or to maintain an oxygen-free atmosphere in various material handling operations, especially in transporting the material. Upon deterioration, the ε-caprolactam becomes partially or totally unusable for the manufacture of highly polymerized products.

One object of the present invention is to provide a novel composition and method of stabilizing liquid ε-caprolactam to prevent harmful deterioration, i.e., any substantial deterioration or decomposition which would render the lactam unusable as a raw material, particularly through discoloration.

Another object of the invention is to provide a specific additive which can be introduced and intimately mixed in small quantities with ε-caprolactam to prevent its harmful deterioration.

Still another object of the invention is to provide a composition of liquid ε-caprolactam which can be easily and economically subjected to any material handling operation and which will not deteriorate to any substantial extent even in the presence of an oxygen-containing atmosphere.

Yet another object of the invention is to provide a method of storing ε-caprolactam as a liquid in order to overcome the disadvantages inherent in the storage of the lactam as a solid.

Another object of the invention is to provide a composition and method of stabilizing liquid ε-caprolactam for storing and transporting which will be helpful in avoiding any danger of contamination by dust or other airborne impurities.

Another object of the invention is to provide a method of stabilizing ε-caprolactam for storage over an extended period of time while avoiding any substantial or harmful deterioration.

These and other objects and advantages of the invention will become more apparent upon a consideration of the following detailed description.

In accordance with the invention, it has now been found that the purity of ε-caprolactam in its liquid state can be maintained over an extended period of time by the addition of a small quantity of an alkaline substance sufficient to stabilize the liquid lactam against harmful deterioration. The ε-caprolactam is preferably heated to its liquid state and maintained at a temperature of from about 60° C. to 100° C. with the addition and intimate admixture of an alkaline compound, preferably from about 0.001 to 2% by weight of the lactam, for the purpose of stabilization against harmful deterioration. Water may also be added to the composition so as to form a highly concentrated solution of ε-caprolactam, preferably containing up to not more than 5% by weight of water based upon the lactam. The use of water provides an especially advantageous method of obtaining a good mixture by first dissolving the stabilizing alkaline compound in water to form an aqueous alkaline solution which can then be added to the molten lactam to form a fine dispersion or solution. The ε-caprolactam composition is easily transported or stored in a liquid state or as a highly concentrated aqueous solution and will not deteriorate or discolor even though exposed to an oxygen-containing atmosphere.

Suitable additives which are particularly useful in preventing harmful deterioration or discoloration of ε-caprolactam include alkali metal and alkaline earth metal bases, aliphatic nitrogen bases, and their salts formed with weak inorganic acids. Generally, any alkaline compounds or substances which will react as an alkali in aqueous solution, and especially non-volatile alkaline compounds, are suitable for the purpose of the invention. Particular examples of such compounds which have been found to be useful include the following: alkali metal and alkaline earth metal hydroxides, alkali metal carbonates, alkali metal cyanides, alkali metal borates, alkali metal phosphates, as well as alkali metal salts of weak organic acids, alkaline earth metal acetates. Mixtures of two or more alkaline compounds can be employed as an additive. It will be readily observed by those skilled in the art that a very large number of alkaline substances or compounds can be employed as an aditive to ε-caprolactam for the purposes set forth by the invention. Particular compounds are named solely for the purpose of illustration, and the scope of the invention is not limited by these specific examples.

The deterioration and corresponding discoloration of a liquid or highly concentrated aqueous solution of pure ε-caprolactam appears to be caused by a reaction of the lactam with oxygen present in the surrounding atmosphere. Even very small quantities of oxygen over a period of time will cause discoloration adversely affecting polycondensates subsequently produced from the lactam. The chemical change or reaction of the ε-caprolactam in the presence of oxygen is accomplished by an increase in the content of volatile bases which are ordinarily present in a pure ε-caprolactam only to a very slight extent, e.g., in quantities of about 0.02 mol percent, and usually about 0.01 mol percent, or less. It has been found that the increase in content of volatile bases provides an excellent criterion or measurement of the degree of deterioration. In other words, by measuring the increase in the content of volatile bases a proportionate degree of deterioration can be established. Deterioration or discoloration can be avoided provided that an increase in the content of volatile bases over that originally present in the pure $\epsilon$-caprolactam is limited to at least 0.02 mol percent, and preferably so that the increase is limited to at least 0.01 mol percent.

The following examples will further illustrate the invention but the invention is not limited to these examples. In each of the examples, the degree of deterioration is shown by the increased quantity of a volatile base in a pure $\epsilon$-caprolactam, which initially contains a maximum quantity of below about 0.01 mol percent of a volatile base. Part (a) of each example illustrates the results obtained by adding an alkaline substance to the lactam in accordance with the invention, while part (b) of each example illustrates the comparative results obtained when no additive is incorporated in the lactam.

EXAMPLE 1

(a) To 900 grams of pure caprolactam having a content of volatile bases of less than 0.01 mol percent, sodium hydroxide was added in a quantity of 0.017% by weight of the lactam, and the mixture was left standing for several days in an open flask inside a drying cabinet which was heated to 80° C. with the admission of air. After 13 days, no increase in the proportion of volatile bases could be ascertained. After 25 days the proportion or content of volatile bases increased to a maximum of 0.02 mol percent, i.e., a net increase of about 0.01 mol percent.

The same starting material of 900 grams of pure caprolactam was combined with the same quantity of sodium hydroxide, i.e. 0.017% by weight, and the sample was allowed to stand for several days in a drying room heated to 90° C. After 5 days, no net increase in the proportion of the volatile bases could be observed. After 12 days, there was likewise no net increase observed in the content of volatile bases.

(b) The same sample of 900 grams of pure caprolactam without the addition of sodium hydroxide was left standing for several days in an open flask inside a drying room heated to 80° C. with the admission of air. After 13 days, the proportion or content of volatile bases was found to be 0.116 mol percent, or a net increase of about 0.10 mol percent. After 25 days, the proportion of volatile bases rose to 0.35 mol percent with a distinct yellow discoloration of the caprolactam. The sample of caprolactam was quite strongly affected after this period of time, and resulted in a yellow discoloration of the polycondensates produced from this sample.

The same starting material, i.e., without an alkaline additive, was heated to 90° and this temperature maintained for several days in the presence of air. Samples were taken from the flask every day for an analysis to determine the content of volatile bases. After 5 days, the content of volatile bases increased to a value of 0.094 mol percent. After 12 days the quantity of volatile bases amounted to 0.185 mol percent.

A tabular summary of the above example clearly establishes the advantage obtained by the addition of sodium hydroxide to caprolactam which is heated at 80° C. or 90° C. for a relatively long period of time. The net increase of the volatile bases in the caprolactam sample containing sodium hydroxide is very slight, i.e., only barely perceptible; whereas without the addition of sodium hydroxide, there is a considerable net increase of volatile base with a corresponding discoloration in which the caprolactam tends to turn yellow.

Table

| 900 g. of caprolactam Proportion of Volatile Bases under 0.01 mol percent. | Quantity of Volatile Bases | | | |
|---|---|---|---|---|
| | at 80° C. after— | | at 90° C. after— | |
| | 13 days | 25 days | 5 days | 12 days |
| (a) With NaOH | No Increase. | 0.02 mol percent. | No Increase. | No Increase. |
| (b) Without NaOH | 0.116 mol percent. | 0.35 mol percent. | 0.094 mol percent. | 0.185 mol percent. |

EXAMPLE 2

(a) 900 grams of a pure caprolactam were intimately mixed with 0.023% by weight thereof of sodium carbonate, which was first dissolved in 2% by weight (based upon the lactam) of water. The caprolactam was allowed to stand for a relatively long period of time in a drying room at 90° C. in the presence of air. After 15 days, the content of volatile bases was measured and found to be less than 0.01 mol percent, i.e., no net increase could be determined. There was no discoloration of the caprolactam.

(b) In a comparative experiment, the same starting material without the addition of sodium carbonate was allowed to stand for the same period of time in a drying room at 90° C. in the presence of air. After 15 days, the content of the volatile bases was determined as 0.215 mol percent, and at the same time a dark yellow discoloration of the caprolactam was observed.

EXAMPLE 3

(a) 900 grams of pure caprolactam were intimately mixed with 0.083% by weight thereof of sodium borate ($Na_2B_4O_7 \cdot 10H_2O$) and 2% by weight of the lactam of water. After a 12-day period during which the composition was heated at 90° C. in the presence of air, the sample remained unchanged and had a content of volatile bases amounting to about 0.01 mol percent.

(b) In a comparative experiment, the same starting material without the addition of sodium borate, was treated for the same period of time and at the same temperature. The content of volatile bases increased after 17 days to 0.23 mol percent.

EXAMPLE 4

(a) To a sample of 900 grams of caprolactam, there was added 0.22% by weight thereof of lithium acetate and the composition was treated in the same manner as Example 1 at 90° C. After 17 days, the content of volatile bases was determined to be 0.01 mol percent. After 26 days, the content of volatile bases still did not exceed a quantity of 0.01 mol percent.

(b) In a comparative experiment the same lactam sample without the addition of lithium acetate was treated in the same manner as part (a) of this example. The content of volatile bases after 17 days amounted to 0.25 mol percent.

EXAMPLE 5

(a) 900 grams of caprolactam were mixed with 0.07% by weight thereof of sodium borate and 0.10% by weight thereof of lithium acetate, and the sample stored at 90° C. in the presence of air. After heating for 20 days, the content of volatile bases was found to be 0.02 mol percent, i.e., a net increase of about 0.01 mol percent.

(b) In a comparative experiment, wherein a mixture of sodium borate and lithium acetate was not added to the same starting material, the content of volatile bases increased, after heating for 20 days at 90° C., to 0.28 mol percent, and a yellow discoloration of the caprolactam occurred.

From the foregoing examples, it will be readily observed that a pure liquid $\epsilon$-caprolactam, which may be defined as having a normal content of not more than about 0.02 mol percent, and usually about 0.01 mol percent or less, of a volatile base, is readily stabilized against deterioration or discoloration by the addition of a small quantity of an alkaline compound or an aqueous alkaline solution. Because of this stabilization, the invention provides a composition of a pure ε-caprolactam which can be satisfactorily stored, transported, or otherwise handled in its liquid state at temperatures between about 60° C. and 100° C.

Thus, it is possible to use standard storage tanks or tank cars which can be easily heated in a conventional manner, and no special measures or precautions are required to prevent contact of the liquid ε-caprolactam with air or other oxygen-containing gas. For extremely long periods of storage, it would of course be helpful to also employ an inert atmosphere. The stabilized liquid ε-caprolactam avoids the necessity of recrushing and melting operations required in the handling of a solid ε-caprolactam, and, therefore, also reduces the number of operations in which the lactam might be exposed to dust or other contaminants. The liquid ε-caprolactam can be employed directly in polycondensation processes without removing the compounds which have been added to prevent deterioration. The production of polycondensates having a high degree of uniform quality and purity of color is thus greatly facilitated by the stabilized ε-caprolactam of this invention.

The invention is hereby claimed as follows:

1. A composition consisting essentially of a pure liquid ε-caprolactam, and a small quantity of at least 0.001% by weight thereof of a non-volatile alkaline compound, selected from the group consisting of alkali metal and alkaline earth metal hydroxides, alkali metal carbonates, alkali metal cyanides, alkali metal borates, alkali metal phosphates, alkali metal salts of weak organic acids and alkaline earth metal acetates, said quantity being sufficient to stabilize said pure ε-caprolactam against harmful deterioration.

2. A composition as claimed in claim 1 consisting essentially of ε-caprolactam maintained at a temperature of about 60° C. to 100° C., and about 0.001 to 2% thereof of said alkaline compound which is non-volatile under said temperature conditions.

3. A composition consisting essentially of an intimate mixture of a substantially pure liquid ε-caprolactam maintained at a temperature of about 60° C. to 100° C., about 0.001 to 2% by weight thereof of an alkaline compound which is non-volatile under said temperature conditions and which is selected from the group consisting of alkali metal and alkaline earth metal hydroxides, alkali metal carbonates, alkali metal cyanides, alkali metal borates, alkali metal phosphates, alkali metal salts of weak organic acids and alkaline earth metal acetates, and up to not more than 5% by weight thereof of water.

4. A method of stabilizing pure ε-caprolactam for storage which comprises liquifying a substantially pure ε-caprolactam, intimately mixing therewith a small quantity of at least 0.001% by weight thereof of an alkaline compound selected from the group consisting of alkali metal and alkaline earth metal hydroxides, alkali metal carbonates, alkali metal cyanides, alkali metal borates, alkali metal phosphateh, alkali metal salts of weak organic acids and alkaline earth metal acetates, said quantity being sufficient to stabilize said pure liquid ε-caprolactam against harmful deterioration, and maintaining said mixture at a temperature of about 60° C. to 100° C., said alkaline compound being non-volatile under said temperature conditions.

5. A method of stabilizing pure ε-caprolactam for storage which comprises liquifying a substantially pure ε-caprolactam, and intimately mixing therewith not more than about 5% by weight thereof of an aqueous alkaline solution in which there is dissolved at least 0.001% by weight based on said ε-caprolactam of a von-volatile alkaline compound selected from the group consisting of alkali metal and alkaline earth metal hydroxides, alkali metal carbonates, alkali metal cyanides, alkali metal borates, alkali metal phosphates, alkali metal salts of weak organic acids and alkaline earth metal acetates.

6. A method of stabilizing pure ε-caprolactam for storage which comprises: intimately mixing (A) a substantially pure liquid ε-caprolactam, (B) about 0.001 to 2% by weight based on said ε-caprolactam of an alkaline compound selected from the group consisting of alkali metal and alkaline earth metal hydroxides, alkali metal carbonates, alkali metal cyanides, alkali metal borates, alkali metal phosphates, alkali metal salts of weak organic acids and alkaline earth metal acetates, and (C) up to not more than 5% by weight based on said ε-caprolactam of water; and maintaining said mixture at a temperature of from about 60° C. to 100° C., said alkaline compound being non-volatile under said temperature conditions.

References Cited in the file of this patent

UNITED STATES PATENTS 2,221,369    Cass  ------------------ Nov. 12, 1940

UNITED STATES PATENT OFFICE
CERTIFICATE OF CORRECTION

Patent No. 2,884,414                 April 28, 1959

Heinz Indest et al.

It is hereby certified that error appears in the printed specification of the above numbered patent requiring correction and that the said Letters Patent should read as corrected below.

Column 2, line 58, for "aditive" read -- additive --; column 5, line 40, after "of", first occurrence, insert -- a pure --; column 6, line 13, for "phosphateh" read -- phosphates --; line 25, for "von-volatile" read -- non-volatile --.

Signed and sealed this 16th day of February 1960.

(SEAL)

Attest:

KARL H. AXLINE
Attesting Officer

ROBERT C. WATSON
Commissioner of Patents